United States Patent Office 3,324,141
Patented June 6, 1967

3,324,141
3-TRICHLOROMETHYL-5-AMINO-1,2,4-THIADIAZOLES
Jack Bernstein, New Brunswick, N.J., assignor to Olin Mathieson Chemical Corporation, New York, N.Y., a corporation of Virginia
No Drawing. Filed Aug. 12, 1965, Ser. No. 479,315
4 Claims. (Cl. 260—302)

This invention relates to new thiadiazoles, and more particularly, to new thiadiazoles of the formula

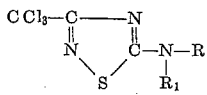

and acid-addition salts thereof, wherein R is amino, hydroxy, alkoxy or aralkoxy and $R_1$ is hydrogen or lower alkyl. The preferred compounds are those wherein R is amino, hydroxy, lower alkoxy (e.g., methoxy, ethoxy, n-propoxy, isopropoxy, butoxy, hexyloxy and octyloxy), or monocyclic aryl (lower alkoxy) (e.g., benzyloxy, phenethoxy, and α-phenylbutoxy), and $R_1$ is hydrogen.

The new compounds of this invention are useful as soil fungicides, in that when mixed into the soil at a concentration of about 50 p.p.m. they protect seeds and plants against a broad spectrum of pathogenic fungi, like species of the fungal genera Phythium, Fusarium, Rhizoctonia and Sclerotium.

The compounds of this invention are prepared by interacting 3-trichloromethyl-5-chloro-1,2,4-thiadiazole with a compound of the formula

wherein R and $R_1$ are as hereinbefore defined.

To form the salt of the free base, the base is dissolved in an inert solvent such as ethanol, and treated with an equivalent of the desired acid. Although any acid may be used, the preferred acids are the mineral acids, such as the hydrohalic acids, sulfuric acid and phosphoric acid. Among the other acids that may be used in preparing the acid addition salts may be mentioned oxalic acid, sulfamic acid, toluenesulfonic acid and the like.

The following examples illustrate the invention (all temperatures being in centigrade):

EXAMPLE 1

*3-trichloromethyl-5-hydrazino-1,2,4-thiadiazole*

(a) *Preparation of 3-trichloromethyl-5-chloro - 1,2,4-thiadiazole.*—A solution of 65 g. (1.625 moles) of sodium hydroxide in 130 ml. of water is added dropwise with stirring during two hours to a mixture of 75 g. (0.378 mole) of trichloroacetamidine hydrochloride, 70 g. (0.376 mole) of trichloromethanesulfenyl chloride and 500 ml. of methylene chloride. The temperature is kept between −4° and 1° by cooling in an ice-salt mixture. The methylene chloride layer is separated, washed twice with 50 ml. of water and dried with sodium sulfate. After evaporation of the solvent, the residue is vacuum distilled to obtain about 50 g. of 3-trichloromethyl-5-chloro-1,2,4-thiadiazole.

(b) *Preparation of 3-trichloromethyl-5-hydrazino-1,2, 4-thiadiazole.*—A solution of 4.76 g. of 5-chloro-3-trichloromethyl-1,2,4-thiadiazole in 20 ml. of ethanol is added dropwise with vigorous stirring to a solution of 4.8 g. of 85% hydrazine hydrate in 50 ml. of ethanol at −5°. The mixture is stirred at −5° to −10° for 2 hours and is then concentrated to dryness under reduced pressure. The residual solid is washed with cold water and recrystallized from 50% aqueous ethanol to yield the desired 3 - trichloromethyl-5-hydrazino-1,2,4-thiadiazole, melting at 183–184° with decomposition.

EXAMPLE 2

*3-trichloromethyl-5-hydroxyamino-1,2,4-thiadiazole*

A solution of 35.8 g. of 5-chloro-3-trichloromethyl-1,2,4-thiadiazole in 50 ml. of absolute ethanol is added dropwise with vigorous stirring to a solution of 25 g. of hydroxylamine in 225 ml. of absolute ethanol at 0° to 5°. The mixture is stirred for 30 minutes, filtered and the filtrate concentrated to about 70 ml. under reduced pressure. The residue is diluted with 600 ml. of water and the precipitated solid is filtered off. The 3-trichloromethyl-5-hydroxylamino-1,2,4-thiadiazole melts at 170–171° with decomposition after recrystallization from acetonitrile.

EXAMPLE 3

*3-trichloromethyl-5-benzyloxyamino-1,2,4-thiadiazole*

A solution of 23.8 g. of 5-chloro-3-trichloro-3-trichloromethyl-1,2,4-thiadiazole in 50 ml. of chloroform is added dropwise with vigorous stirring to a solution of 12.3 g. of benzyloxyamine and 10 g. of triethylamine in 250 ml. of chloroform, during the course of one hour. The solution is stirred for 2 hours at room temperature and is then heated to reflux for 2 hours. The cooled mixture is washed with water, dried overy anhydrous magnesium sulfate and then concentrated under reduced pressure at room temperature. The residue is triturated with hexane and then with water. The solid is recrystallized from acetonitrile to yield the desired 3-trichloromethyl-5-benzyloxyamino-1,2,4-thiadiazole, melting at 153–155°.

Similarly, by following the procedure of Example 3, but substituting other alkoxyamines for the benzyloxyamine, the corresponding 3-trichloromethyl-5-RO-amino-1,2,4-thiadiazoles are formed. Thus, methoxyamine yields 3 - trichloromethyl - 5 - methoxyamino-1,2,4-thiadiazoles; ethoxyamine yields 3 - trichloromethyl - 5 - ethoxyamino-1,2,4-thiadiazole and N-ethoxyethylamine yields 3-trichloromethyl-5-(N-ethoxy-N-ethyl)amino-1,2,4-thiadiazole.

EXAMPLE 4

*3-trichloromethyl-5-hydrazino-1,2,4-thiadiazole, hydrochloride*

To a solution of 2 g. of 3-trichloromethyl-5-hydrazino-1,2,4-thiadiazole in absolute ethanol there is added an equivalent of an alcoholic solution of hydrogen chloride. Anhydrous ether is added to the mixture to complete the precipitation of the salt. The mixture is filtered and the hydrochloride of 3-trichloromethyl-5-hydrazino-1,2,4-thiadiazole thus obtained may be recrystallized from a mixture of ethanol and ether.

The invention may be variously otherwise embodied within the scope of the appended claims.

What is claimed is:
1. A compound selected from the group consisting of bases of the formula

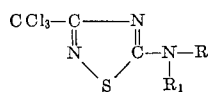

wherein R is selected from the group consisting of amino, hydroxy, alkoxy and aralkoxy and $R_1$ is selected from the group consisting of hydrogen and lower alkyl; and acid-addition salts thereof.
2. 3-trichloromethyl-5-hydrazino-1,2,4-thiadiazole.
3. 3 - trichloromethyl - 5 - hydroxyamino-1,2,4-thiadiazole.
4. 3 - trichloromethyl - 5 - benzyloxyamino-1,2,4-thiadiazole.

References Cited
FOREIGN PATENTS
1,339,238   8/1963   France.

OTHER REFERENCES
Bulka et al., Berichte 95 (1962), pages 1983–8.
Goerdeler et al., Berichte, 97 (1964), pages 238–43.
Martynoff, Bull. Soc. Chim., France, 1952, pages 1056–60.

ALEX MAZEL, *Primary Examiner.*
RICHARD J. GALLAGHER, *Assistant Examiner.*